_United States Patent Office_

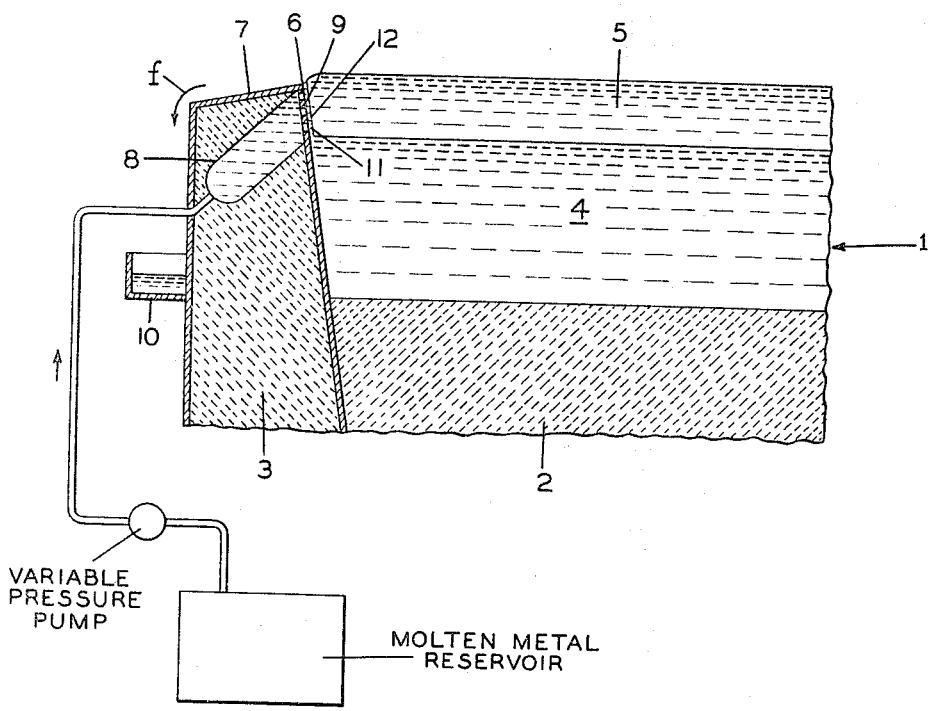

3,328,147
Patented June 27, 1967

1

3,328,147
METHOD OF AND APPARATUS FOR FORMING FLAT GLASS ON A LIQUID BATH
Robert Touvay, Paris, France, assignor to Compagnie de Saint-Gobain, Neuilly, France
Filed Sept. 5, 1963, Ser. No. 306,846
Claims priority, application France, Sept. 12, 1962, 909,199
9 Claims. (Cl. 65—65)

The invention relates to the production of a glass ribbon by flowing molten glass onto a liquid bath, of greater density than the density of the glass, which is maintained at suitable temperature. It is known that the cast glass spreads out on the liquid bath and produces a transparent ribbon whose faces are sufficiently plane and parallel to avoid the need of further surface treatments.

It is also known that in such production the thickness of the glass ribbon is limited to a fixed value related to the surface tension of glass with respect to bath so that the possible variations in thickness are relatively limited for one kind of bath and one kind of glass.

If it is desired to obtain a thickness greater than the thickness corresponding to the natural balance between the forces of gravity and surface tension, which is about 6.5 m./m. in the case of a molten tin bath, it is necessary to confine the ribbon laterally. Moreover, the lateral confining of cast glass between walls has the drawback that the movement of the thick glass ribbon against the wall of the tank affects the flatness and the correct formation of the ribbon by braking effect.

According to the process of the present invention it is possible to eliminate the braking due to friction against the tank walls by the interposition between the glass and the lateral walls of a liquid acting as a lubricant, for example molten tin, or other convenient molten metal or oxide or salt having no prejudicial action on the glass and the bath. For example one may utilise, to confine the glass ribbon, permeable side bars whose interior faces are practically vertical and through which the liquid may exude.

The following description relates to a preferred embodiment but is given only as example and must be read with reference to the accompanying drawing representing a partial transverse section of a glass ribbon floating on a bath of molten tin. The edges of the ribbon are in contact with the lateral walls of the tank.

The tank 1 comprises a bottom 2 and lateral walls 3 and contains a bath of molten tin 4 having such a height that the glass ribbon 5 floating on the tin projects a few millimeters over the top edge 6 of the lateral walls of the tank. The top face 7 of said walls is sloped toward the exterior of the tank. In the interior of the lateral walls is provided a channel 8 connected to the supply of molten metal and opening into the tank by the means of the lateral bars 9 permeable to molten tin. A collector 10 fixed on the external face of the lateral walls collects tin in excess as indicated hereinafter. The channels 8 are filled with molten tin under pressure sufficient to allow it to exude from the permeable bars 9. A film 11 is then formed between the bars 9 and the edges 12 of the glass band. Any excess of tin escaping from the bars 9, flows over the upper edge 7 according to the arrows (f) and collects in the collector 10. Said tin is now recovered and may be recycled to eliminate any oxides formed.

2

What is claimed is:
1. An apparatus for the flowing of a glass ribbon onto a liquid bath comprising a tank containing the liquid bath, two permeable bars closely above the bath placed on the inner face of both lateral walls of the tank, the top edge of the lateral walls of the tank being sloped toward the exterior, a channel for the supply of lubricant under pressure to the permeable bars, a collector on the external faces of the lateral walls to collect the excess of lubricant exuded from the bars and overflowing the sloped top edge of the lateral walls, a lubricant reservoir, a pump, a conduit leading from the lubricant reservoir to the pump and a conduit leading from the pump to said channel whereby to supply lubricant under pressure to said channel.

2. In an apparatus according to claim 1 the liquid bath supporting the glass ribbon has such a height that the top face of the glass band projects a few millimeters over the top edge of the tank.

3. In an apparatus according to claim 1 the liquid bath is molten tin.

4. In an apparatus according to claim 1 the lubricant is molten tin.

5. In the continuous manufacture of flat glass by flotation on and movement over the surface of a molten bath the steps of confining the moving glass between fixed side walls which contact its edges, and introducing a fluid lubricant for the glass between the moving glass and the fixed, contiguous walls as needed to maintain lubrication.

6. In the process of the flowing of glass on a liquid bath more dense than the glass and maintained at a suitable temperature for the formation of a glass ribbon having a thickness greater than the thickness corresponding to the equilibrium of the natural forces of gravity and of the surface tension between the glass and the bath, and having its two faces levelled and fire polished, the step of confining the glass ribbon between lateral bars permeable to a liquid lubricant, and forcing the liquid lubricant through the permeable lateral bars under pressure.

7. Apparatus for the production of flat glass by flotation comprising tank means to contain a flotation liquid, means to deposit a molten sheet of glass on the liquid, said tank having wall means extending above the liquid level, said wall means having perforations at a level at which the lubricant will form a film between the edges of the sheet and the wall, and means to force a lubricant through the perforations to form the film.

8. Apparatus according to claim 7 in which the wall means extend below the liquid level and converge downwardly.

9. Apparatus according to claim 7 in which the wall means has upper surfaces sloping downwardly and outwardly to provide escape for surplus lubricant.

References Cited
UNITED STATES PATENTS

| | | | |
|---|---|---|---|
| 3,140,164 | 7/1964 | Long | 65—99 X |
| 3,163,408 | 12/1964 | Brichard | 65—182 X |
| 3,248,197 | 4/1966 | Michalik et al. | 65—32 X |

DONALL H. SYLVESTER, *Primary Examiner.*
A. D. KELLOGG, *Assistant Examiner.*